(12) United States Patent
Hafermalz et al.

(10) Patent No.: US 9,216,760 B2
(45) Date of Patent: Dec. 22, 2015

(54) STEERING GEAR

(71) Applicant: ZF LENKSYSTEME GMBH, Schwaebisch Gmuend (DE)

(72) Inventors: Jens Hafermalz, Waeschenbeuren (DE); Dennis Fuechsel, Schwaebisch Gmuend (DE)

(73) Assignee: Robert Bosch Automotive Steering GmbH, Gmuend (DE)

( * ) Notice: Subject to any disclaimer, the term of this patent is extended or adjusted under 35 U.S.C. 154(b) by 0 days.

(21) Appl. No.: 14/387,344

(22) PCT Filed: Apr. 5, 2013

(86) PCT No.: PCT/EP2013/057172
§ 371 (c)(1),
(2) Date: Sep. 23, 2014

(87) PCT Pub. No.: WO2013/152995
PCT Pub. Date: Oct. 17, 2013

(65) Prior Publication Data
US 2015/0040699 A1 Feb. 12, 2015

(30) Foreign Application Priority Data
Apr. 12, 2012 (DE) .................. 10 2012 103 146

(51) Int. Cl.
*B62D 3/04* (2006.01)
*F16H 1/16* (2006.01)
(Continued)

(52) U.S. Cl.
CPC .. *B62D 3/02* (2013.01); *B62D 3/04* (2013.01); *B62D 5/0409* (2013.01); *B62D 5/0454* (2013.01); *F16H 19/02* (2013.01); *F16H 55/24* (2013.01); *F16H 57/039* (2013.01); *F16H 57/12* (2013.01); *F16C 2380/27* (2013.01); *F16H 2057/0213* (2013.01); *F16H 2057/0222* (2013.01); *F16H 2057/127* (2013.01); *Y10T 74/188* (2015.01); *Y10T 74/19623* (2015.01); *Y10T 74/19828* (2015.01)

(58) Field of Classification Search
CPC ...... B62D 5/0409; B62D 5/04; B62D 5/0454; B62D 3/04; F16H 2057/0213; F16H 55/24; F16H 57/12; Y10T 74/19828; Y10T 74/19623; F16C 2361/61; F16C 2380/27
USPC ............ 180/444, 443; 74/409, 388 PS, 89.14
See application file for complete search history.

(56) References Cited

U.S. PATENT DOCUMENTS 8,667,858 B2 3/2014 Fuechsel et al.
2001/0040067 A1* 11/2001 Murakami ........... B62D 5/0409
180/444
(Continued)

FOREIGN PATENT DOCUMENTS

DE 10 2009 002 940 11/2010
DE 10 2009 054 655 6/2011
WO WO-2011/073089 6/2011
WO WO-2011/129280 10/2011

*Primary Examiner* — Keith Frisby
(74) *Attorney, Agent, or Firm* — Jordan and Hamburg LLP

(57) ABSTRACT

A steering gear having a gearwheel, having a pinion which meshes with said gearwheel and having a pinion shaft which comprises the pinion and winch is mounted so as to be pivotable about a pivot axis perpendicular to the longitudinal axis of the pinion shaft wherein the radial spacing between the pivot axis and the location of toothed engagement between the gearwheel and pinion is smaller than the core radius of the pinion.

12 Claims, 5 Drawing Sheets

(51) Int. Cl.
*B62D 3/02* (2006.01)
*B62D 5/04* (2006.01)
*F16H 57/12* (2006.01)
*F16H 55/24* (2006.01)
*F16H 57/039* (2012.01)
*F16H 19/02* (2006.01)
*F16H 57/021* (2012.01)
*F16H 57/022* (2012.01)

(56) References Cited

U.S. PATENT DOCUMENTS

| | | | |
|---|---|---|---|
| 2009/0314114 A1* | 12/2009 | Grosberg | F16H 55/24 74/409 |
| 2012/0125132 A1 | 5/2012 | Bernhard et al. | |
| 2012/0227526 A1* | 9/2012 | Lescorail | F16H 55/24 74/406 |
| 2012/0272765 A1 | 11/2012 | Fuechsel et al. | |
| 2013/0025960 A1 | 1/2013 | Hama et al. | |

* cited by examiner

STEERING GEAR

BACKGROUND OF THE INVENTION

The invention relates to a steering gear, and in particular to a steering gear for a power steering system of a motor vehicle.

In most motor vehicles, there are installed power steering systems which, during steering maneuvers, generate an assisting moment and thereby reduce the steering moment that has to be imparted to the steering column by the driver.

Known power steering systems are based on a steering gear which converts the drive power of a hydraulic or electric drive and transmits said drive power to the steering column. Steering gears of said type are generally in the form of a helical rolling-type gear, and are in particular in the form of a helical wheel gear or pinion gear, that is to say said steering gears comprise a gearwheel, which is connected directly or indirectly to the steering column, and a pinion which is driven by the drive via a pinion shaft.

In the case of such steering gears, gearing play has proven to be a problem, said gearing play arising owing to component tolerances, different thermal expansion of the gearing elements and wear. In particular during so-called alternating steering, that is to say during directly successive steering maneuvers with alternating steer angle, such gearing play generates undesired noises resulting from alternating abutment of opposite flanks of teeth of the pinion and gearwheel.

It is known for said gearing play to be eliminated by virtue of the pinion shaft being mounted so as to be pivotable about an axis running perpendicular to the longitudinal axis of the pinion shaft and at a distance from the toothing engagement of pinion and gearwheel, and being pressed against the gearwheel by means of one or sore spring elements. Here, the pivoting capability of the pinion shaft is integrated into one of the two bearing arrangements by which the pinion shaft is mounted at its ends. Said bearing arrangement is also referred to as "fixed bearing". The bearing arrangement in the region of the other end is then implemented with play (so-called "floating bearing") in order to permit the deflection caused by the pivoting movement. The fixed bearing is generally provided at the drive side, whereas the floating bearing is provided on the free end of the pinion shaft. The one or more spring elements for pressing the pinion against the gearwheel are generally integrated into the floating bearing.

A corresponding generic steering system is known for example from WO 2011/073089 A1. In said document, provision is made for the rolling bearing which receives the pinion shaft in the region of the fixed bearing to be mounted, at the outside, in a pivot ring. The pivot ring comprises an inner ring, which receives the rolling bearing substantially without play, and an outer ring, which is held substantially without play in a bore of a housing of the steering gear, wherein the outer ring and the inner ring are connected by way of multiple narrow webs which are twisted in the event of a rotation of the outer ring relative to the inner ring.

Other solutions for forming the pivotable fixed bearing provide for the rolling bearing to be pivotably mounted, at the outside, in a plain bearing or, at the inside, in a silent bushing, or simply for a rolling bearing to be provided which has such a degree of play that the desired pivoting capability can be realized.

In the known solutions, owing to the construction, the pivot axis intersects the central axis of the fixed bearing, or the longitudinal axis of the pinion shaft.

A disadvantage of the bearing arrangements known from the prior art for realizing freedom from play in the engagement between pinion and gearwheel is the fact that there is noticeably different steering behavior during anticlockwise and clockwise rotation of the steering column.

SUMMARY OF THE INVENTION

Taking this prior art as a starting point, the invention was based on the object of specifying an improved steering gear for a power steering system of a motor vehicle. In particular, it is sought to specify a steering gear which does not exhibit, or at least exhibits to a reduced extent, the different steering behavior during anticlockwise and clockwise rotation of the steering column, such as is known from the described prior art.

Said object is achieved by means of the subject matter of the independent patent claim. Advantageous embodiments are the subject of the dependent patent claims, and emerge from the following description of the invention.

The invention is based on the realization that, in the case of the known steering gears with gearing play compensation, the different steering behavior arises as a result of oppositely directed moments about the pivot axis of the fixed bearing which are generated during the anticlockwise and clockwise rotation of the steering column and the corresponding assistance rotation of the drive of the power steering system. Said different moments result from the oppositely directed toothing forces daring the anticlockwise and clockwise rotation in conjunction with the lever arm formed by the spacing between the line of action of the toothing forces and the pivot axis. The opposite reaction moments about the pivot axis cause, in one direction, an increase of the force with which the pinion is pushed against the gearwheel, and consequently an increase in the friction moment of the gearing, and in the opposite direction, a corresponding decrease of the friction moment in the gearing.

The invention is therefore based on the concept of as far as possible eliminating, but at least reducing, these oppositely acting moments. This is realized by virtue of the radial spacing between the line of action of the toothing forces and the pivot axis being designed to be as small as possible, and preferably being reduced to (substantially) zero. A reduction of said spacing (preferably to zero) results, likewise, in a reduction (elimination) of the reaction moments. The different steering behavior during anticlockwise and clockwise rotation, such as is known from the prior art, can thus be reduced or eliminated entirely.

A generic steering gear having a gearwheel, having a pinion which meshes with said gearwheel, and having a pinion shaft which comprises the pinion and which is mounted so as to be pivotable about a pivot axis lying perpendicular to the longitudinal axis of the pinion shaft, is accordingly refined according to the invention in that the radial spacing (with respect to the pinion shaft or the gearwheel) between the pivot axis and the toothing engagement is as small as possible, but at least smaller than the core radius of the pinion (that is to say the radial spacing between the longitudinal axis of the pinion shaft and the root of the toothing of the pinion).

Said spacing is particularly preferably substantially zero, whereby the generation of the reaction moments that cause the different steering behavior can be eliminated entirely.

According to the invention, the "toothing engagement" is to be understood to mean the tangential plane at the contact point between the pitch or rolling circles of the pinion and gearwheel.

In a preferred refinement of the steering gear according to the invention, it may be provided that the pivot axis is arranged in a pinion shaft bearing arrangement which is positioned in the region of one of the ends and preferably in the region or the drive-side end (that is to say that end of the pinion shaft by which said pinion shaft is connected to a drive, for example to an electric motor). For this purpose, a (first) bushing may be provided which has an (at least one) (preferably ring-shaped) outer part and an (at least one) (preferably ring-shaped) inner part arranged within the outer part, wherein the outer part and the inner part are connected, so as to form the pivot axis, by way of at least one web which permits a relative rotation of the outer part with respect to the inner part. For this purpose, the web may preferably be designed to be deferrable, and in particular elastically deformable, such that said web has the action of a torsion spring bar. In this way, not only is it possible in a simple manner to realize the pivot axis in the (first) bushing, but it is additionally also possible for elastic restoring forces to be generated by means of which the pinion can be pressed against the gearwheel with the aim of compensating the gearing play. For this purpose, it is preferably provided that the web (the bushing integrated into the housing of the steering gear) is twisted.

The gearing play is adversely affected in particular by wear of the gearwheel and pinion, that is to say the gearing play tendentially becomes greater over the service life of the sneering gear. This, by implication, requires gearing play compensation that acts to an increasing extent over the service life. This in turn requires that the elastic deflection and thus the preload of the spring element that effects the gearing play compensation should be selected to be relatively large in a new steering gear. In the preferred embodiment of the steering gear according to the invention, in which the preload is realized by means of one or more webs that act as torsion spring bar, it should therefore be provided that the outer part is twisted relative to the inner part of the bushing to an adequate extent, and that said twist is, as far as possible, reduced to zero in the presence of the maximum gearing play to be expected. For this purpose, provision is preferably made for the longitudinal axis of the pinion shaft to enclose a defined pivot angle with the toothing plane in the new state of the steering gear.

To achieve this, it may be provided that a receptacle for the fixed bearing in the housing of the steering gear is positioned relative to the gearwheel such that said pivot angle is geometrically obtained in the case of a non-worn gearwheel and pinion. Provision may however also preferably be made for a radial offset between the longitudinal axis of the pinion shaft in the region of the fixed bearing and the central axis of the gearwheel, which offset gives rise to the defined pivot angle, to be realized by means of non-concentric positioning of the outer part and of the inner part of the (first) bushing. This permits inexpensive manufacture of the housing of the steering gear if the pinion shaft—as is preferably provided—is mounted in the region of both of its ends in the housing.

Aside from the bearing arrangement of the preferably drive-side end of the pinion shaft in the (first) bushing of the fixed bearing, it is preferably the case that, at the free end of the pinion shaft, there is provided a (second) bushing as part of a floating bearing which permits a deflection of the free end of the pinion shaft owing to a pivoting movement about the pivot axis formed in the fixed bearing. For this purpose, it is preferably provided that the (second) bashing has an (at least one) outer part and an (at least one) inner part, wherein the outer part and the inner part are connected to one another such that these are movable relative to one another in at least a radial direction (with respect to the pinion shaft).

The outer part and the inner part of the (second) bushing of the floating bearing are preferably, like those of the (first) bushing of the fixed bearing, of (circular) ring-shaped form. This makes it possible, in combination with the radial offset, formed in the (first) bushing of the fixed bearing, for the two receptacles to be manufactured in the housing of the steering gear in one working step by means of one tool with cutting action, because, despite the offset of the central axes of the fixed bearing and of the floating bearing, as is provided for the function of the gearing play compensation, the two receptacles can be arranged concentrically with respect to one another.

Forming the (second) bushing of the floating bearing as a coherent unit, which nevertheless permits the desired radial displaceability of the outer part with respect to the inner part, may provide that the outer part and the inner part are connected to one another via a (at least one) joint.

With the exception of the relative displacement between the outer part and the inner part of the (second) bushing of the floating bearing, which is intended to permit a deflection of the free end of the pinion shaft, the bearing arrangement of the free end of the pinion shaft should exhibit the least possible play in order to prevent interlocking of the pinion by the gearwheel. To achieve this, it is preferably provided that the spacing between the outer part and the inner part in the section situated radially opposite the joint is as small as possible, but is preferably not zero. A spacing of merely approximately 0.1 mm may be provided, for example.

The joint may preferably be formed by virtue of a section of the outer part and a section of the inner part making contact in the region of the joint, wherein said sections of the outer part and inner part are surrounded by a sleeve composed of a highly elastic material (for example an elastomer). The joint movement is then made possible by sliding or rolling of the sections of the outer part and inner part on one another, whereas the sleeve, on the one hand, scarcely hinders said joint movement and, on the other hand, ensures that the outer part and inner part are held together.

To make the manufacture and assembly of the (second) bushing of the floating bearing as inexpensive as possible, it may preferably be provided that the small spacing provided in that section of the bushing which is situated radially opposite the joint is first generated when the bushing is installed in the housing. This may preferably be achieved by virtue of the outer part and/or the inner part having, in the relevant section, a delimiting element which is displaceable in a radial direction and the radial width of which is furthermore preferably greater than the radial wrath of the corresponding section of the outer part and/or of the inner part. In this way, it can be achieved that, when a (second) bushing of the floating bearing has not been installed in the housing of the steering gear (or mounted on the pinion shaft), the delimiting element is displaced radially outward (or radially inward) to such an extent that a relatively large spacing is formed between the inner part and the delimiting element, which is advantageous for the production and assembly of the bushing. Here, owing to its relatively large radial width, the delimiting element may project beyond the outer surface of the outer part (or the inner surface of the inner part). When the (second) bushing of the floating bearing is in the installed state, said protrusion of the delimiting element is not possible as a result of a collision with the receptacle of the housing (or of the pinion shaft). Therefore, to be installed, the fastening element must be pushed radially inward (or outward) and fixed in said position, in which it forms the desired small spacing with the inner ring, by the receptacle of the housing (or of the pinion shaft).

The invention will be explained in more detail below on the basis of an exemplary embodiment illustrated in the drawings.

DETAILED DESCRIPTION OF THE PREFERRED EMBODIMENTS

Figure 1:
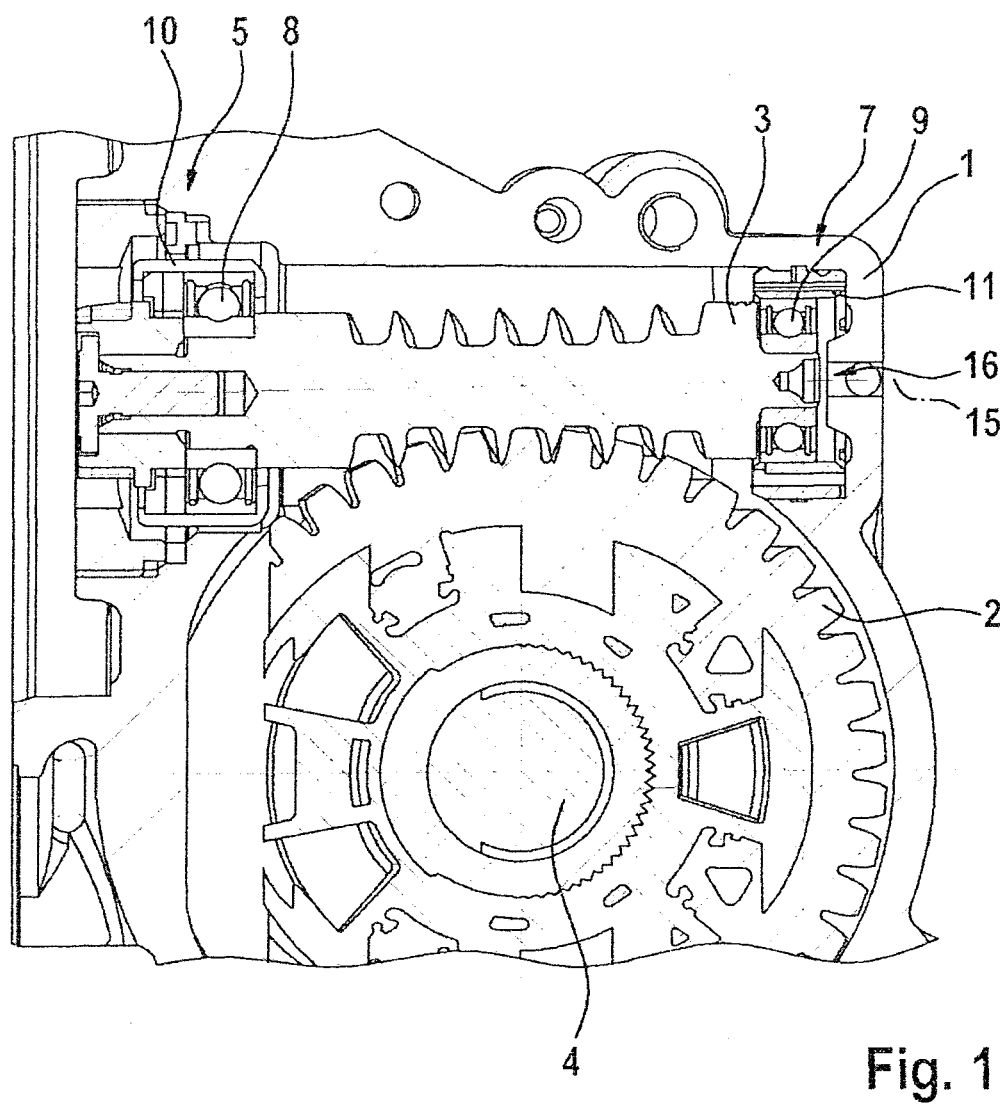
FIG. 1 shows a steering gear according to the invention in a longitudinal section.

FIG. 1 shows the main constituent parts of an embodiment of a steering gear according to the invention. Said steering gear comprises a housing 1, within which there are mounted a gearwheel 2 and a pinion 3 that meshes with the gearwheel 2. The pinion 3 and a pinion shaft that comprises the pinion are configured integrally in the form of a worm.

The gearwheel 2 is fastened fixedly to a steering column 4 of a motor vehicle.

The pinion 3 has a drive-side end by which it can be connected to the drive output shaft of a drive (for example electric motor) that is not illustrated. In the region of said drive-side end, the pinion 3 is mounted in the housing by way of a first bearing arrangement. Said bearing arrangement is in the form of a fixed bearing 5 which permits substantially no translation of the pinion 3 relative to the housing 1 but permits a pivoting movement about a pivot axis 6.

Said pivoting causes a deflection of the free end, situated opposite the drive-side end, of the pinion 3, said pinion being mounted at said free end by means of a floating bearing 7 in a corresponding receptacle of the housing 1. Said floating bearing 7 is designed so as to permit the deflection of the free end that results from the pivoting of the pinion 3.

Both the fixed bearing 5 and the floating bearing 7 comprise a respective rolling bearing 8, 9, in which the corresponding section of the pinion 3 is mounted substantially without play. The rolling bearings 8, 9 themselves are mounted in a respective bushing 10, 11, which in turn is arranged substantially without play in a corresponding receptacle of the housing 1. The bushings 10, 11 are implemented in structural terms such that—in the case of the fixed bearing 5—said bushings permit the pivoting of the pinion 3 about the pivot axis 6 and—in the case of the floating bearing 7—said bushings permit the deflection of the free end of the pinion 3.

For this purpose, the bushing 10 of the fixed bearing 5 comprises an outer part in the ions of an outer ring 12 (composed for example of spring steel) and an inner part in the form of an inner ring 13 (composed for example of spring steel). The outer ring 12 is connected to the inner ring 13 via two webs 14 (composed for example of spring steel), wherein the two webs 14 run substantially collinearly and thus form the pivot axis 6 about which the outer ring 12 can be pivoted relative to the inner ring 13. Here, the webs 14 and thus the pivot axis 6 however run not through the center of the bushing 10 but so as to be radially offset relative thereto (cf. FIGS. 2 and 3). The pivot axis thus does not intersect the longitudinal axis 16 of the pinion 3.

Figure 2:
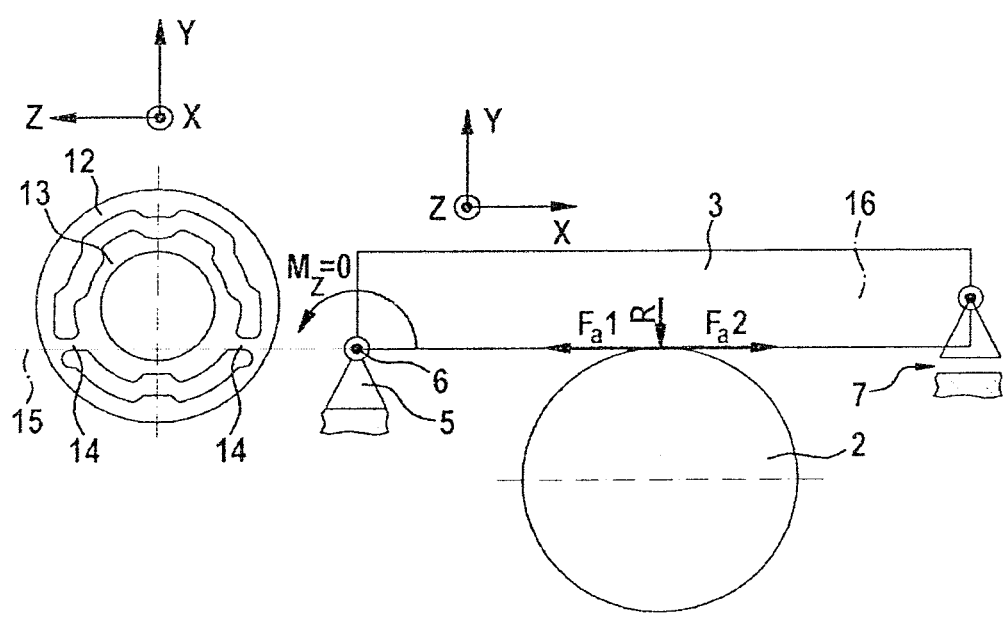
FIG. 2 shows the function of the steering gear from FIG. 1 in a schematic illustration.
Figure 3:
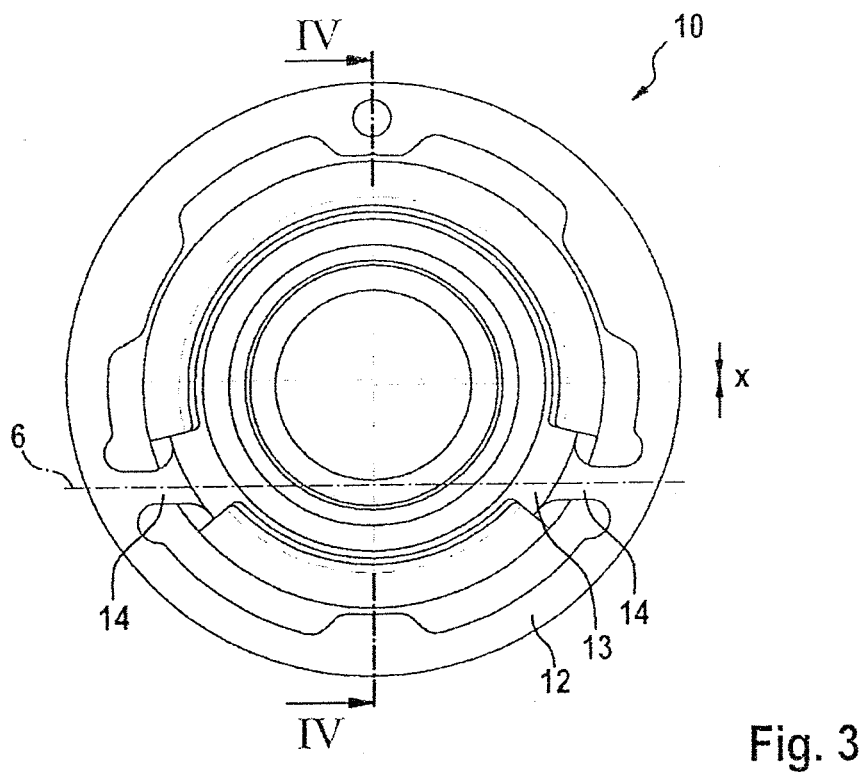
FIG. 3 shows, in a plan view, the fixed bearing used in the steering gear of FIG. 1.

Owing to said radial offset of the webs 14 with respect to the center of the bushing, the pivot axis 6 is relocated into the vicinity of the outer circumference of the pinion 3, whereby the generation of reaction moments ($M_z$), such as arise or would arise owing to the toothing forces ($F_{a1}$, $F_{a2}$) acting at the toothing engagement between pinion and gearwheel in conjunction with the spacing between the line of action 15 of the toothing forces ($F_{a1}$, $F_{a2}$) and the pivot axis 6, can be reduced or eliminated. For the most complete possible elimination of the reaction moments ($M_z$=0), it is provided that the pivot axis 6 lies within the tangential plane formed at the contact point between the two pitch circles or rolling circles of gearwheel 2 and pinion 3 (toothing engagement 15), as is schematically illustrated in FIG. 2.

Figure 7:
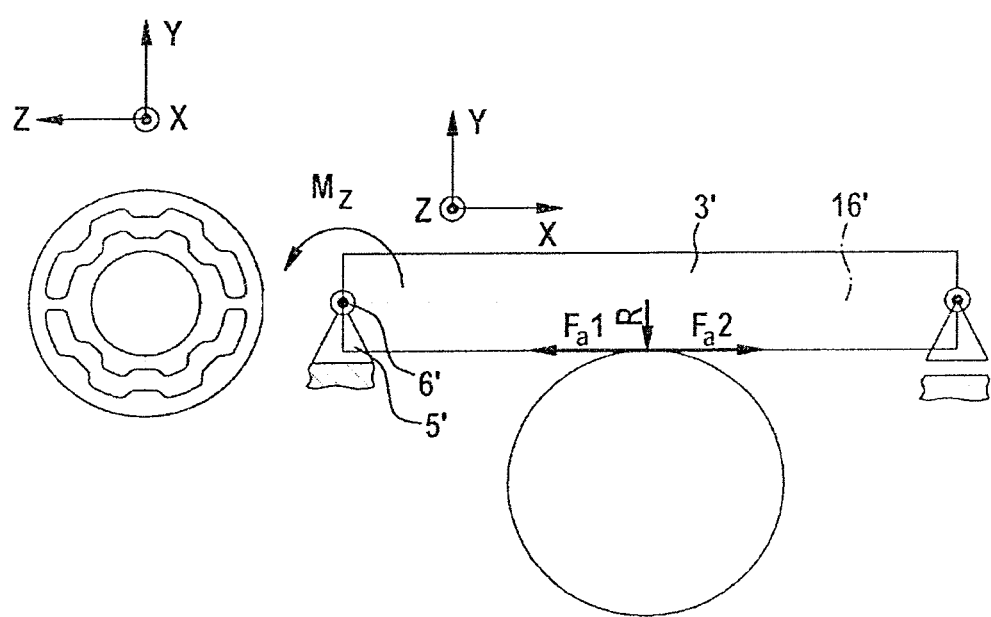
FIG. 7 shows the generation of reaction moments in a generic steering gear as per the prior art, in a schematic illustration corresponding to FIG. 2.

By contrast, FIG. 7 illustrates how, in the case of a generic steering gear according to the prior art, a reaction torque ($M_z \neq 0$) is generated about the pivot axis 6', which pivot axis in that case intersects the longitudinal axis 16' of the worm 3' and consequently runs through the center of the bushing of the floating bearing 5'. Said reaction moment ($M_z \neq 0$) results in steering behavior that is different during an anticlockwise rotation of the steering column than during a clockwise rotation of the steering column, because, owing to the oppositely directed toothing forces ($F_{a1}$, $F_{a2}$), the directions of the resulting reaction moments ($M_z \neq 0$) are also opposite. This has the effect that, when the steering column rotates, the pressure-exerting force (R) is increased or decreased, and the friction moment of the steering gear is increased or reduced, depending on the direction of rotation.

A lug 23 and, on the opposite side, a corresponding depression 24 are furthermore formed on the outer ring 12 of the bushing 10 of the fixed bearing 5. These serve for the positive positioning of the bushing 10 and of the fixed bearing 5 in the housing 1. For this purpose, the housing 1 has a corresponding counterpart contour.

Figure 5:
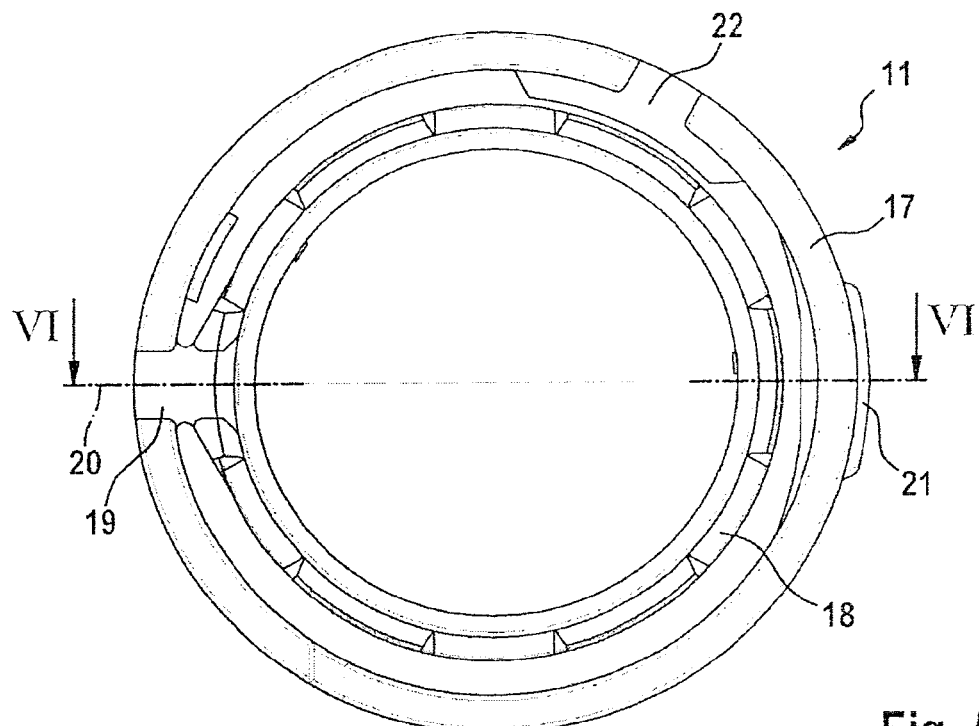
FIG. 5 shows, in a plan view, the bushing of the floating bearing as used in the steering gear of FIG. 1.
Figure 6:
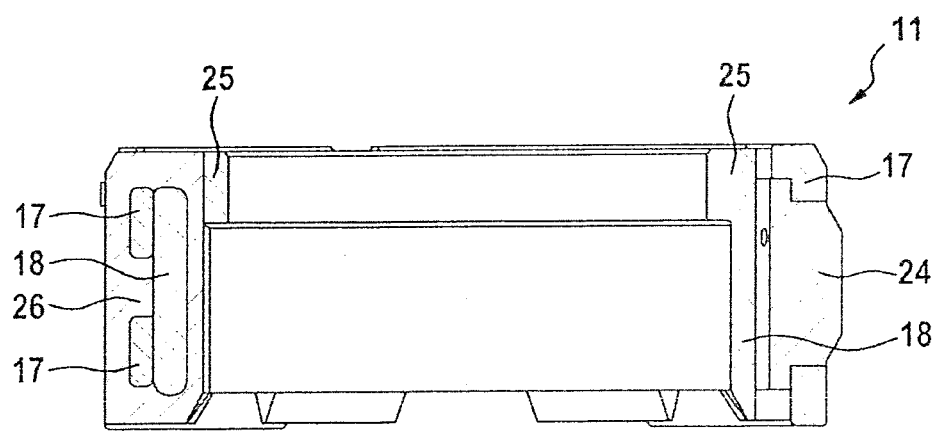
FIG. 6 shows the bushing of figure FIG. 5 in a longitudinal section along the section plane VI-VI in FIG. 5.

FIGS. 5 and 6 show the bushing which forms a part of the floating bearing 7 arranged in the region of the free end of the worm 3. A main function of said bushing 11 is that of permitting a translational movement (deflection) of the free end of the worm 3 owing to the pivoting thereof about the pivot axis 6 formed in the fixed bearing 5. For this purpose, the bushing 11 likewise comprises an outer part in the form of an outer ring 17 and an inner part in the form of an inner ring 18. The inner ring 18 is arranged concentrically within the outer ring 17 with a substantially constant spacing. In one section, the inner ring 18 is connected to the outer ring 17 via a radially running web 19. In the region of the web 19, sections of the outer ring 17 and of the inner ring 18 make contact, wherein said sections are surrounded by an elastomer ring 26. Owing to this configuration, the web 19 forms a pivot joint with a low pivoting moment, which allows the outer ring 17 to pivot relative to the inner ring 18 about a pivot axis lying in the region of the web 19. During said pivoting movement, the outer ring 17 and the inner ring 18 slide or roll on one another in the sections that make contact, while the elastomer ring permits said relative movement of outer ring 17 and inner ring 18 and additionally ensures that said outer ring and inner ring are held together.

The inner ring 18 of the bushing 11 of the floating bearing 7 also has a collar 24. Said collar serves, in conjunction with the rolling bearing 9, for the axial positioning of the bushing 11 in the housing 1.

Provision is made for the bushing 11 of the floating bearing 7 to be integrated into the housing 1 of the steering gear such that the pivoting of the pinion 3 about the pivot axis 6 formed in the fixed bearing 5 leads to a displacement of the inner ring 18 relative to the outer ring 17 in a direction substantially perpendicular to the radial axis 20 extending through the web 19. By contrast, in the direction perpendicular to said direction, that is to say in the direction of the radial axis 20, extending through the web 19, of the bushing 11, there should be as far as possible no possibility for displacement of the outer ring 17 with respect to the inner ring 18, in order to prevent interlocking of the pinion 3 on the gearwheel 2 during operation of the steering gear. This is achieved in that the spacing between the inner ring 18 and the outer ring 17 in that section of the bushing 11 which is situated radially opposite the web 19 is restricted to a small dimension of for example 0.1 mm. This is achieved by means of a delimiting element 21 which is mounted within the outer ring 17 so as to be displaceable in the radial direction. The delimiting element 21 has a radial width greater than the radial width of the outer ring 17. In this way, the delimiting element 21 of the bushing 11 that has not yet been installed in the housing 1 can be displaced so far outward that it protrudes beyond the outer surface of the outer ring 17. In this way, a relatively large spacing is set between the outer side of the inner ring 18 and the delimiting element 21. Said spacing is reduced to the desired dimension during the installation of the bushing 11 in the housing 1 because then, as a result of a collision with the housing 1, the delimiting element 21 can no longer protrude beyond the outer surface of the outer ring 17.

The outer ring 17 of the bushing 11 furthermore comprises an abutment element 22 which restricts a movement of the inner ring 18 during a pivoting movement of the worm upward in FIGS. 1 and 2.

Figure 4:
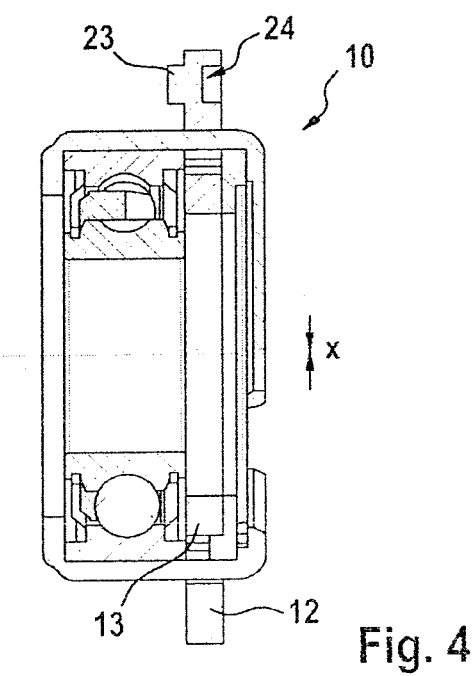
FIG. 4 shows the fixed bearing of FIG. 3 in a longitudinal section along the section plane IV-IV in FIG. 3.

The steering gear according to the invention realizes compensation of gearing play such as may arise in particular owing to manufacturing tolerances of the components of the steering gear, owing to different thermal expansions of said components and owing to wear. Said gearing play compensation is achieved by virtue of the pinion 3 being mounted in pivotable fashion and being pressed against the gearwheel 2 under spring loading. The spring loading is realized—in the same way as the formation of the pivot axis 6—by the webs 14 of the bushing 10 of the fixed bearing 5, which webs are twisted, and thus act functionally as torsional spring bars, as a result of the relative rotation of the outer ring 12 with respect to the inner ring 13. To attain a spring preload sufficient to compensate for the increasing level of wear over the service life of the steering gear, provision is made for the pinion 3 to be equipped with a relatively large pivot angle in the newly manufactured state of the steering gear. For this purpose, provision is made for the pinion 3 to be integrated into the housing 1 such that she longitudinal axis 16 of said pinion has a slightly smaller spacing to the toothing engagement, or to the line of action 15 of the toothing forces ($F_{a1}$, $F_{a2}$), in the region of the fixed bearing 5 than in the region of the floating bearing 7 (cf. FIG. 1). This offset is realized by means of a corresponding offset (x) of the inner ring 12 with respect to the outer ring 13 of the bushing 10 of the fixed bearing 5; these are thus arranged so as not to be exactly concentric (cf. FIGS. 3 and 4). It is made possible in this way for the fixed bearing 5 and the floating bearing 7, despite the offset (x) provided, to be arranged in receptacles of the housing 1 which are themselves concentric. The production of the housing 1 can be simplified in this way.

LIST OF REFERENCE NUMERALS

1 Housing
2 Gearwheel
3 Pinion
4 Steering column
5 Fixed bearing
6 Pivot axis
7 Floating bearing
8 Rolling bearing
9 Rolling bearing
10 Bushing
11 Bushing
12 Outer ring
13 Inner ring
14 Web
15 Toothing engagement
16 Longitudinal axis of the pinion
17 Outer ring
18 Inner ring
19 Web
20 Radial axis
21 Delimiting element
22 abutment element
23 Lug
24 Depression
25 Collar
26 Elastomer ring

We claim:

1. A steering gear comprising a gearwheel having a pinion which meshes with said gearwheel, and having a pinion shaft which comprises the pinion and which is mounted so as to be pivotable about a pivot axis lying perpendicular to the longitudinal axis of the pinion shaft, wherein the radial spacing between the pivot axis and the toothing engagement of gearwheel and pinion is smaller than the core radius of the pinion.

2. The steering gear as claimed in claim 1, wherein the radial spacing between the pivot axis and the toothing engagement of gearwheel and pinion is zero.

3. The steering gear as claimed in claim 1, wherein the pinion shaft has a drive-side end, wherein, in the region of the drive-side end, the pinion shaft is mounted in a first bushing which has an outer part and has an inner part arranged within the outer part, wherein the outer part and the inner part are connected, so as to form the pivot axis, by way of at least one deformable web.

4. The steering gear as claimed in claim 3, wherein the web is twisted.

5. The steering gear as claimed in claim 3, wherein the outer part and the inner part are arranged non-concentrically.

6. The steering gear as claimed in claim 5, wherein the outer part of the first bushing and the outer part of the second bushing are mounted in a respective receptacle formed by a housing of the steering gear, wherein the two receptacles are arranged concentrically.

7. The steering gear as claimed in claim 1, wherein the pinion shaft has a free end, wherein, in the region of the free end, the pinion shaft is mounted in a second bushing, wherein the second bushing has an outer part and has an inner part arranged within the outer part, wherein the outer part and the inner part are movable relative to one another in a radial direction with respect to the pinion shaft.

8. The steering gear as claimed in claim 7, wherein the outer part of the second bushing is connected to the inner part by way of a joint.

9. The steering gear as claimed in claim 8, wherein a section of the outer part and a section of the inner part make contact in the region of the joint, wherein said sections are at least partially surrounded by a sleeve composed of an elastic material.

10. The steering gear as claimed in claim 8, wherein the spacing between the outer part and inner part in that section of the second bushing which is situated radially opposite the joint is smaller than the spacing in the remaining section of the second bushing.

11. The steering gear as claimed in claim 10, wherein either one or both of the outer part and the inner part has, radially opposite the joint, a delimiting element that is displaceable in a radial direction.

12. The steering gear as claimed in claim 11, wherein the delimiting element has a radial width greater than the radial width of the outer part or of the inner part in the section in which said delimiting element is mounted displaceably in said outer part or inner part.

* * * * *